3,324,736
VARIABLE PULLEY SYSTEM
Arthur B. Bassoff, Oak Park, Mich., assignor to National Broach & Machine Company, Detroit, Mich., a corporation of Michigan
Filed Nov. 23, 1964, Ser. No. 413,020
4 Claims. (Cl. 74—230.17)

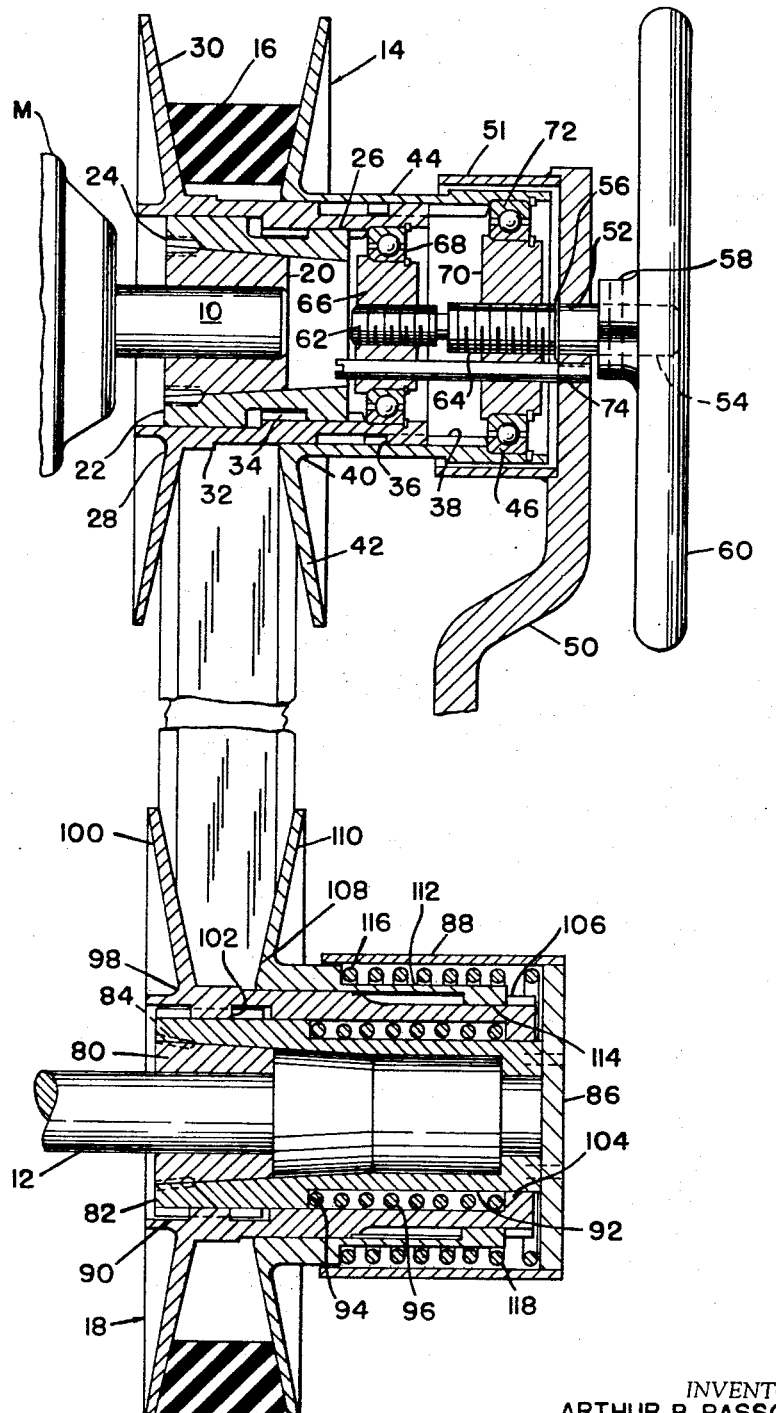

The present invention relates to a variable pulley system designed for giving a continuous speed adjustment. Essentially, the system comprises two V-sheaves cooperating with a V-belt, one of the sheaves being mechanically adjustable by a hand wheel or the like to vary the spacing between opposite sheave parts, the other sheave being self-adjusting with its two parts urged towards each other by springs.

It is an object of the present invention to provide a pulley system of the character described in which the mechanically adjustable sheave provides for equal and opposite adjustment of the two sheave parts so that the center line of the V-belt is not displaced on adjustment.

It is a further object of the present invention to provide a pulley system of the character described characterized in the relatively low mass of rotating parts together with the symmetrical design thereof which permits high speed rotation and repeated reversal without the difficulties which have limited the use of such systems in the past.

It is a further object of the present invention to provide a pulley system as described in the foregoing in which the other of the sheaves includes relatively axially movable sheave parts each of which is independently adjustable with radial means urging the parts towards each other in a direction to reduce the spacing between the flanges thereof.

Other objects and features of the invention will become apparent as the description proceeds, especially when taken in conjunction with the accompanying drawing, illustrating a preferred embodiment of the invention, wherein:

The figure is a sectional view through the pulley system, taken on the center line thereof.

As disclosed herein, the system is designed to transmit power at an infinitely variable ratio between the output shaft 10 of a motor M and a driven shaft 12. Power is transmitted from a mechanically adjustable sheave indicated generally at 14 through a V-belt 16 to a self-adjusting sheave indicated generally at 18.

Referring first to the sheave 14, there is provided a bushing assembly comprising a taper lock bushing 20 fixedly secured to the motor output shaft 10 and connected to a mounting bushing 22 by lock screws 24. The mounting bushing 22 is splined as indicated at 26. Connected to the splined portion 26 of the bushing 22 is a first sheave part 28 having an inclined flange 30 and a cylindrical portion 32 slidable on a cylindrical surface on the bushing 22. Sheave part 28 is internally splined as indicated at 34, the spline of this portion cooperating with the splined portion 26 of the bushing 28 to mount the sheave part 28 for axial movement on the mounting bushing 22 while preventing relative rotation thereto. Since the connection between the bushing 22 and the sheave part 28 is a spline connection, it is effective to provide a very strong driving connection between the parts while retaining dynamic balance, results which cannot be achieved by providing a key connection between these parts.

The sheave part 28 is provided with an externally splined portion 36 connected to the internally splined portion 38 of the second sheave part 40. The sheave part 40 includes the inclined flange 42 and a tubular sleeve portion 44 which in addition to the splined portion 38 includes a bearing seat 46.

With this arrangement it will be observed that as so far described, the sheave part 28 is axially slidable on the mounting bushing 22, and the sheave part 40 is axially slidable on the sheave part 28.

The means for effecting mechanical adjustment between the sheave parts 28 and 40 by manual operation comprises a bracket 50 carrying a cylindrical housing element 51 and provided with an opening 52 through which extends a screw shaft 54. The screw shaft 54 is mounted in the opening 52 for rotation and for limited axial movement between positions as determined by a snap ring 56 and the hub 58 of a hand wheel 60.

The screw shaft 54 is provided with a pair of threaded portions 62 and 64 of equal lead but opposite hand. Associated with the threaded portion 62 is a nut 66 connected by a bearing 68 to the sheave part 28. Associated with the threaded portion 64 is a nut 70 connected by a bearing 72 to the sheave part 40.

Carried by the bracket 50 is a pin 74 which extends through openings in the nuts 66 and 70 so as to prevent rotation thereof.

It will be apparent that with the construction just described the nuts 66 and 70 may be adjusted toward or away from each other effecting a corresponding relative axial adjustment between the sheave parts 28 and 40. At the same time, the bearings 68 and 72 provide for free rotation of the adjustable sheave 14 on the mounting structure. It will further be observed that adjustment of the sheave parts 28 and 40 provides simultaneous equal and opposite movement thereof so that the center line of the V-belt 16 is not displaced. However, the alignment between the two sheaves or pulleys is not critical since some float of the sheave 14 axially is provided for, as previously described.

The V-belt 16 driven by the sheave 14 transmits rotation to the self-adjusting pulley or sheave. The sheave 18 comprises a taper lock bushing 80 secured to the driven shaft 12 and carrying a tubular mounting bushing 82 which is secured thereto by screws 84. At its outer end the bushing 82 has secured thereto a plate 86 carrying a cylindrical housing element 88. The bushing 82 is externally splined as indicated at 90, and is reduced at the opposite end as indicated at 92 providing a shoulder 94 constituting a seat for a compression spring 96.

Slidable on the bushing 82 is a third sheave part 98 having an inclined flange 100 and an internally splined portion 102 slidably connected to the splined portion 90 of the bushing 82. Sheave part 98 includes a radially inwardly extending flange 104 at the end opposite the inclined flange 100 and this constitutes an abutment for the opposite end of the spring 96. With this arrangement the sheave 98 is urged to the right as seen in the figure, relative to the mounting bushing 82.

The sheave part 98 at the outer side of its end opposite to the inclined flange 100 is provided with an elongated splined portion 106.

A fourth sheave part 108, having an inclined flange 110, is provided with an elongated tubular extension 112 having an internal spline 114 slidably associated with the splined portion 106 of the sheave part 98. In addition, the tubular extension 112 of the sheave part 108 is on a reduced outside diameter providing an annular spring seat 116 against which one end of the compression spring 118 bears. The opposite end of the compression spring 118 bears against the plate 86 carried by the mounting bushing 82. The compression spring 118 therefore urges the sheave part 108 to the left as seen in the figure. With this arrangement the sheave parts 98 and 108 are urged relative to each other in directions tending to cause approach between the inclined flanged portions 100 and 110 thereof.

With the construction just described it will be observed that the sheave parts 98 and 108 of the pulley or sheave 18 are independently adjustable and that they are independently biased towards each other by independent spring means interposed between the mounting structure including the bushing 82 and the separate sheave parts. Accordingly, the sheave parts 98 and 108 shift automatically into position to align themselves properly with the V-belt 16. Moreover, as the spracing between the sheave parts 28 and 40 is changed by movement of the hand wheel 60, the spacing between the inclined flanges 100 and 110 automatically adjusts to provide for movement of the V-belt toward and away from the axis of the sheave 18. More specifically, as the hand wheel is adjusted to position the inclined flanges 30 and 42 towards each other, thereby forcing the upper portion of the V-belt 16, as seen in the figure, to move upwardly, the lower portion of the V-belt in engagement with the sheave 18 is forced into the converging space between the inclined flanges 100 and 110, thus forcing these flanges apart against the action of the springs 96 and 118.

Both of the sheaves 14 and 18 are characterized in that the rotatable parts are completely symmetrical about the axis of rotation and are designed to minimize the mass thereof. Accordingly, high speed rotation of either of the sheaves does not result in dynamic unbalance, and accordingly, the pulley system operates freely and without undesirable vibration. Moreover, the sheaves are designed so that a minimum mass is in rotation so that inertia is minimized. Accordingly, the work required to reverse rotation of the pulley system is reduced materially so that in practice the system may be employed in operations where both high speed rotation and repeated rapid reversals of the direction of rotation are required.

The drawing and the foregoing specification constitute a description of the improved variable pulley system in such full, clear, concise and exact terms as to enable any person skilled in the art to practice the invention, the scope of which is indicated by the appended claims.

What I claim as my invention is:

1. An adjustable width drive pulley comprising a taper lock bushing assembly adapted to be secured fixedly and symmetrically to a shaft, said bushing assembly being elongated axially of the shaft on which it mounts and comprising an external cylindrical locating surface and a splined drive portion spaced axially from said locating surface, a first sheave part having an elongated sleeve provided internally at one end with a cylindrical locating surface slidable on the locating surface of said bushing assembly and at the opposite end with a splined drive portion engaged with and slidable on the splined drive portion of said bushing and provided externally with an axially spaced cylindrical locating surface and a splined driving portion and a conically inclined belt-engaging flange at one end of said sleeve; a second sheave part having an elongated sleeve provided internally with a cylindrical locating surface slidable axially on the locating surface provided externally on said first sheave part and a splined drive portion engaged with and slidable on the splined drive portion provided externally on said first sheave part, and an oppositely inclined conical belt-engaging flange at one end of the sleeve on said second sheave part, said flanges being at corresponding ends of said sleeves, and together defining a pulley for use with a belt having inclined edges; and means for providing opposite movement of said sheave parts relative to said bushing assembly comprising a screw shaft having opposite hand threaded portions, said shaft being coaxial with said drive shaft and extending into both of said sleeves, nuts on said shaft portions, thrust bearings connecting each of said nuts to one of said sleeves, means for preventing rotation of said nuts, and means for rotating said screw shaft to move said sheave parts axially in opposite directions.

2. A pulley as defined in claim 1 comprising a support mounting said screw shaft for rotation and effective to support it against substantial lateral displacement in axial alignment with said drive shaft.

3. A pulley as defined in claim 2 comprising means acting between said support and said screw shaft providing for limited axial movement thereof.

4. A pulley comprising a mounting body having means for fixing it to a shaft, a tubular member having an outwardly extending flange at one end, said member being slidable longitudinally on said body and having one end extending beyond said body to provide an open chamber therein, drive connections between said body and member, a sleeve having an outwardly extending flange at one end, said sleeve being slidable longitudinally on said tubular member to vary the spacing between said flanges, drive connections between said tubular member and sleeve, said sleeve extending beyond the end of said tubular member to provide an open chamber in said sleeve, nuts of opposite hand in said chambers, a fixed bracket, a screw shaft rotatably carried by said bracket and extending into both of said chambers, said shaft having threaded portions of opposite hand engaged in said nuts, bearings connecting said nuts to said tubular member and sleeve respectively, means preventing rotation of said nuts, and means for rotating said shaft to adjust said pulley.

References Cited

UNITED STATES PATENTS

| | | | |
|---|---|---|---|
| 2,096,431 | 10/1937 | Keller | 74—230.17 |
| 2,611,277 | 9/1952 | Mitchell | 74—230.17 |
| 3,117,461 | 1/1964 | Fermier | 74—230.17 |
| 3,175,409 | 3/1965 | Macy | 74—230.17 |

FRED C. MATTERN, JR., *Primary Examiner.*

DAVID J. WILLIAMOWSKY, *Examiner.*

J. A. WONG, *Assistant Examiner.*